United States Patent [19]

Myers

[11] Patent Number: 5,247,657
[45] Date of Patent: Sep. 21, 1993

[54] SERIAL DATA TRANSMISSION INCLUDING IDLE BITS

[75] Inventor: Nicholas S. Myers, London, England

[73] Assignee: Psion plc, London, United Kingdom

[21] Appl. No.: 582,492

[22] Filed: Sep. 14, 1990

[30] Foreign Application Priority Data

Sep. 19, 1989 [GB] United Kingdom ............... 8921143

[51] Int. Cl.$^5$ ..................... G06F 15/16; G06F 11/10
[52] U.S. Cl. ............................. 395/550; 395/200; 395/800
[58] Field of Search .............. 364/271.1, 271.2, 271.3, 364/271.4, 200; 395/550, 200, 800

[56] References Cited

U.S. PATENT DOCUMENTS

| | | | |
|---|---|---|---|
| 4,272,675 | 6/1981 | Blanford et al. | 235/437 |
| 4,393,501 | 7/1983 | Kellogg et al. | 364/200 |
| 4,481,572 | 11/1984 | Oshaner | 364/200 |
| 4,556,958 | 12/1985 | Ugon | 364/200 |
| 4,574,348 | 3/1986 | Scallon | 364/200 |
| 4,803,620 | 2/1989 | Inagami et al. | 364/200 |
| 4,872,003 | 10/1989 | Yoshida | 340/825.08 |

FOREIGN PATENT DOCUMENTS 0183273 6/1986 European Pat. Off. .

OTHER PUBLICATIONS

Gonzales, David Ruimy, "Serial Peripheal Interfacing Techniques," *Microelectronics Journal*, Jan./Feb. 1986, vol. 17, No. 1, Luton, Beds., Great Britain, pp. 5-14.

Horelick, D. and L. Paffrath, "A New Serial System for Camac," *Interfaces in Computing*, May 1985, vol. 3, No. 2, Lausanne, Switzerland, pp. 143-152.

Mitchell, Ron, Nabil Damouny, Carl Fenger, Ad Moelands, "An Integrated Serial Bus Architecture: Principles and Applications," *IEEE Transactions on Consumer Electronics*, Nov. 1985, vol. CE-31, No. 4, New York, pp. 687-698.

*Primary Examiner*—Eugene R. LaRoche
*Assistant Examiner*—Christopher Glembocki
*Attorney, Agent, or Firm*—Kilpatrick & Cody

[57] ABSTRACT

A serial data interface communicates data between a control processor (1) and one or more slave processors (2) via a serial bus (3). Typically the control processor (1) may be formed in a hand held or lap top computer and the slave processor (2) in a peripheral device for the computer. The control processor (1) transmits a clock signal over a clock line in the serial bus (3) to the slave processor (2). At the same time, control or data frames are transmitted from the control processor (1) the slave processor (2) or data frames are transmitted from the slave processor (3) to the control processor (1). Each data frame has a control portion which identifies the frame as a control frame or as a data frame, and following the control portion a plurality of data bits bounded by idle bits. Both the slave processor (2) and the control processor (1) free the data line for a change in the direction of data transmission during each idle bit.

In a preferred example, each control frame includes a select bit identifying the control frame as a slave select frame or as a slave control frame. Each slave control frame includes data transmission parameters which set the slave processor (2) to read or write one or more data frames subsequent to the current control frame.

23 Claims, 7 Drawing Sheets

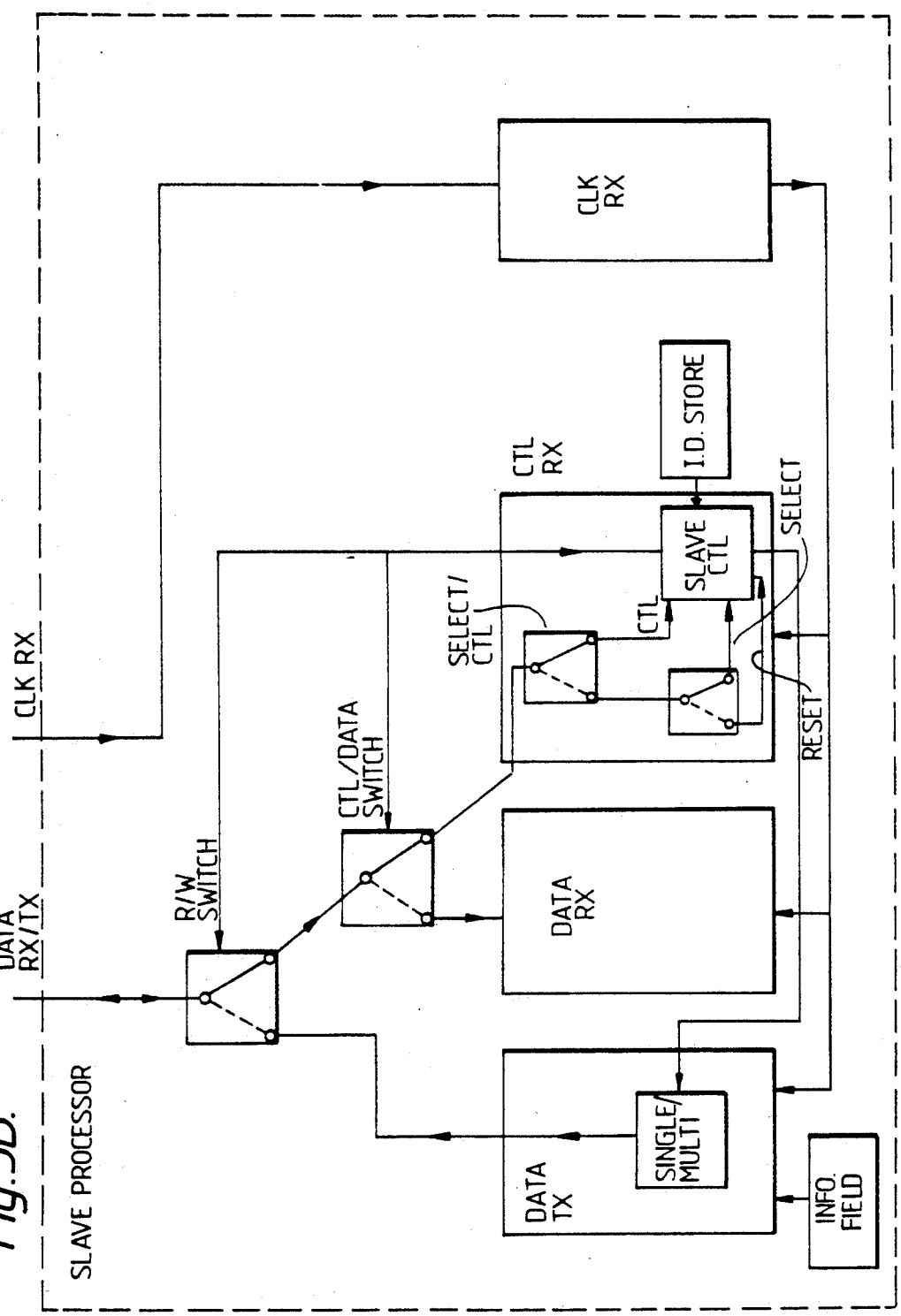

SERIAL DATA TRANSMISSION INCLUDING IDLE BITS

FIELD OF THE INVENTION

The present invention relates to the transmission of serial data and in particular to the communication of data between a control processor and one or more slave processors connected to a two wire serial bus.

It is known, for example, to use a serial interface in which data is transmitted between processors over a single bi-directional data line. U.S. Pat. No. 4,556,958 discloses a smart card data carrier which is arranged to be coupled to a master processor in a data processing station over a serial interface. Such an interface has the advantage that since it requires only a few conductors it is physically robust and lends itself to miniaturisation.

Serial interfaces suffer one major disadvantage in that they offer less bandwidth than an equivalent parallel interface. While this disadvantage may not be of significance in a specialised application such as smart cards it presents a major barrier to the adoption of a serial interface as a general purpose interface in, for example, a personal computer. Such a general purpose interface is typically used to connect a computer to peripherals such as mass storage devices or modems and so requires a wide bandwidth if the interface is not to become a bottleneck which seriously restricts the performance of the computer.

SUMMARY OF THE INVENTION

According to a first aspect of the present invention, a method of communicating data between a control processor and a slave processor over a serial interface comprising a bi-directional data line and a uni-directional clock line, comprises:

transmitting a clock signal from the control processor over the clock line to the slave processor, and at the same time transmitting control or data frames from the control processor to the slave processor or transmitting data frames from the slave processor to the control processor;

each frame comprising a control portion to identify a frame as a control frame or as a data frame, and following the control portion a plurality of data bits bounded by idle bits, both the slave and the control processor freeing the data line for a change in the direction of data transmission during each idle bit.

Preferably each control frame includes as one of its data bits a select bit which identifies the control frame as a slave select frame or as a slave control frame;

each slave select frame including as a further one of its data bits a reset bit, when the reset bit takes one predetermined value the transmission of the slave select frame to the slave processor causing the slave processor to reset to a predetermined state otherwise the transmission of the slave select frame to the slave processor selecting or de-selecting the slave processor;

each slave control frame including as one or more of its data bits data transmission parameters to set the slave processor to read or write one or more data frames subsequent to the current control frame.

Although the control processor may be the CPU of a computer incorporating the serial interface it will in general be formed by dedicated logic circuits associated with the interface.

The present invention provides a system which maximises the efficiency with which data is transmitted across a serial interface and by so doing increases the effective bandwidth of the interface to such an extent that it is suitable for use as a general purpose interface in a personal computer.

The transmission of data is governed by a protocol which has a number of features which contribute to the high efficiency of the system. In particular, the protocol is designed to minimise the need for contention procedures and so to increase the proportion of the available bandwidth which is available for useful data transmission. To this end the slave processor is arranged to function as an essentially passive device which accesses the bus only in response to control signals from the control processor, this serving to remove the possibility of conflict between the control processor and the slave. The efficiency of the control and data transmission procedures is further increased by the provision of two idle bits in each frame, one either end of the stream of data bits. At each idle bit the transmitting processor releases the bus and so provides an opportunity for the other processor to gain access to the bus. The frame structure therefore makes it possible for the direction of data transmission to be changed within the space of a single frame. The presence of an idle bit at the end of the frame after the data bits also makes it possible to transmit frames back-to-back without risk of metastability problems at the transition between frames.

Preferably the transmission parameters for the slave control frame include a read/write bit to determine whether the slave processor reads or writes data in the succeeding data frame and a single/multi bit to determine whether the slave transmits or receives single or multiple units of data in the subsequent data frames.

The units of data may be single bytes or byte pairs and the slave control frame may include a byte/two byte bit to indicate which unit of data is used.

Preferably the data bits of the slave select frame include an ID field, the slave processor connected to the interface being assigned a unique ID number, the slave processor in response to any slave select frame including its unique ID number subsequently transmitting to the control processor a data frame including a predetermined information field.

The slave processor may form part of a wide variety of different peripherals. The transmission of an information field from the slave processor to the control processor enables the control processor to identify the form of peripheral in which the slave processor is embedded and to adjust its operation to tailor the interface to the characteristics of the particular peripheral. When a number of peripherals are connected to the interface at one time a specific slave may be selected by the control processor by use of that slave's ID number. When the system is first booted the control processor may poll all possible ID numbers to determine which peripherals are present.

Preferably the control processor adjusts the rate of the clock output to the maximum rate compatible with a particular slave processor in response to the information field received from the slave processor.

A further important feature of the present system in maximising the efficiency of data transmission across the interface is the use of a variable clock rate which is set to an appropriate value by the master processor in accordance with the needs of the particular peripherals attached to the interface.

According to a second aspect of the present invention a system for communicating serial data comprises;

a control processor;

a slave processor; and a serial interface linking the control processor to the slave processor, the serial interface comprising a bi-directional data line and a uni-directional clock line, the control processor including clock means arranged to transmit a clock signal over the clock line to the slave processor while at the same time the control processor transmits control or data frames to the slave processor or receives data frames transmitted from the slave processor;

the control processor including transmitting means arranged to transmit control frames and data frames onto the interface and reading means arranged to read data frames from the interface;

the slave processor including transmitting means arranged to transmit data frames onto the interface and reading means arranged to read control frames and data frames from the interface;

the transmitting means and reading means being arranged to transmit and read respectively frames comprising a control portion identifying a frame as a control frame or as a data frame, and following the control portion a plurality of data bits bounded by idle bits, both the slave and the control processor freeing the data line for a change in the direction of data transmission during each idle bit, the slave processor being arranged to receive the clock signal from the clock line and to synchronise the operation of the slave processor transmitting and reading means with the control processor in response to the clock signal.

BRIEF DESCRIPTION OF THE DRAWINGS

A system in accordance with the present invention will now be described in detail with reference to the accompanying drawings, in which:

FIG. 5B is a schematic block diagram of a processor configured for a control function.

DESCRIPTION OF A PREFERRED EXAMPLE

Figure 1:
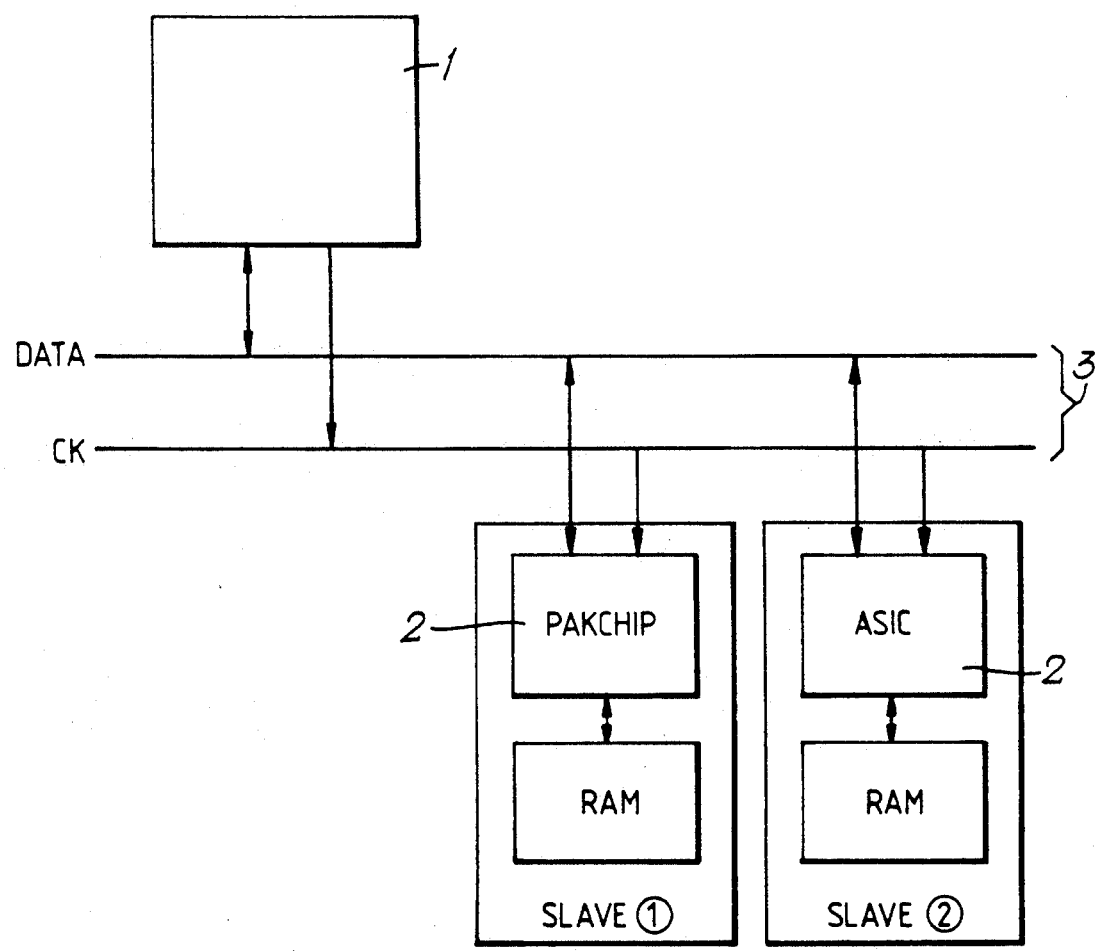
FIG. 1 is a block diagram of a system for communicating serial data.

A serial data interface comprises a control processor 1, slave processors 2, and a serial bus 3 which communicates data between the control processor 1 and the slaves 2. In the present example, the control processor 1 and the serial bus 3 form part of a general purpose hand-held computer (not shown) and the slave processors 2 are embedded in external mass storage devices for the computer.

The serial bus 3 consists of two wires, a bi-directional synchronised data line and a uni-directional clock line. The data line may be used to transfer data from the controller 1 to one or more of the slaves 2 or to transfer data from the slaves 2 to the controller 1. The clock line by contrast carries a signal in one direction only, that is from the controller 1 to the slaves 2. The clock is transmitted continuously during the transfer of the data to synchronise the slaves 2 to the controller 1.

Figure 3:
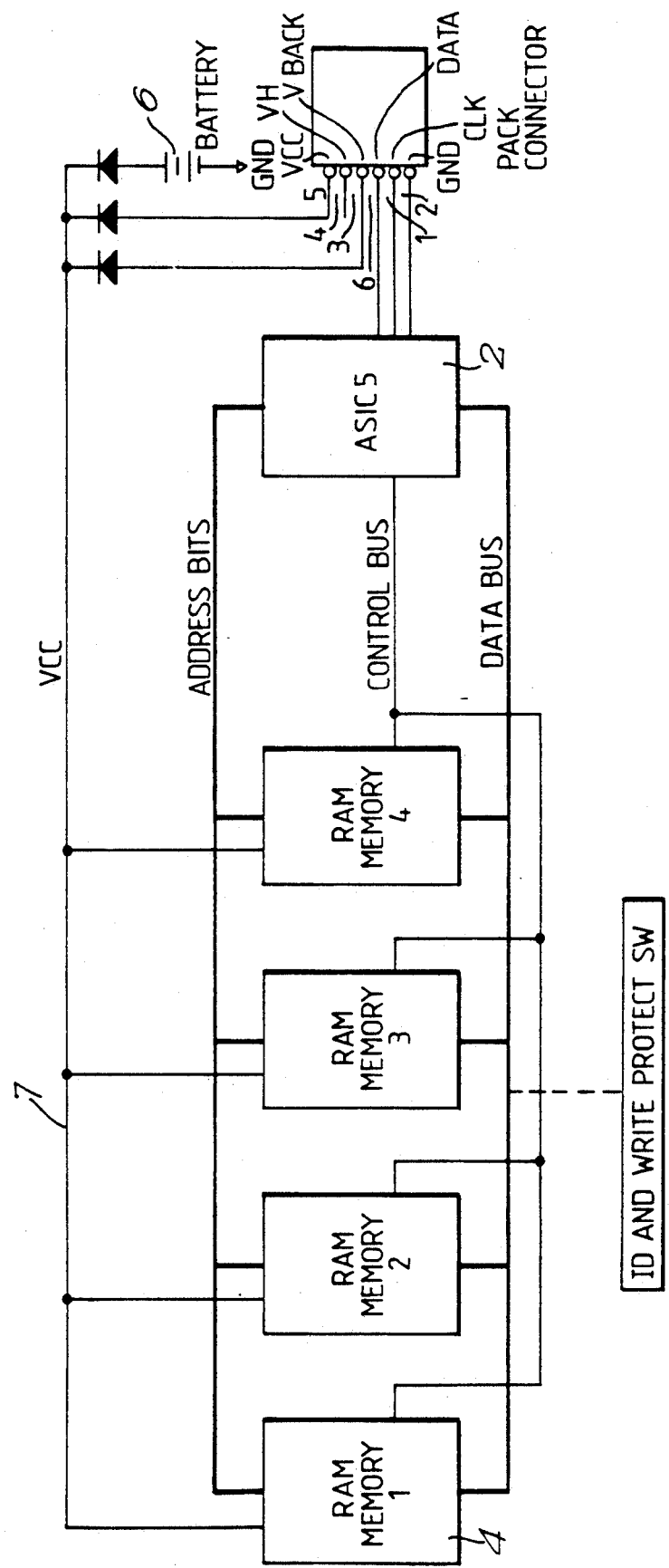
FIG. 3 is a block diagram of a RAM based memory for use in the system of the present invention.
Figure 4:
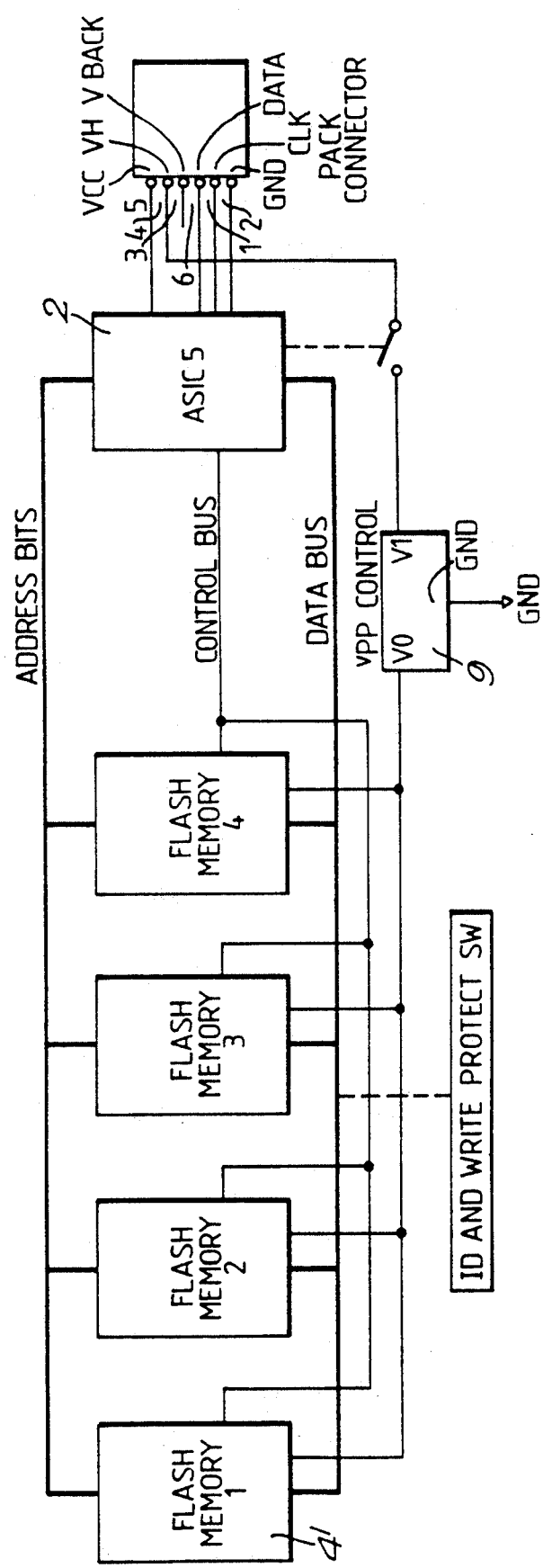
FIG. 4 is a block diagram of a FEEPROM based memory for use in the system of the present invention.

FIG. 3 shows the structure of a memory PAK incorporating a slave processor 2. A six pin connector 5 couples the PAK to the bus. Four RAMs 4 are connected by address, data and control buses to the slave processor 2, and by a supply line 7 to a battery 6. The PAK of FIG. 4 is generally similar in structure but uses $FE^2PROMs$ 4' in place of the RAMs. A control unit 9 is provided to control the application of erase voltages. The slave processor 2 sets a switch S connecting the control unit 9 to a pack connector 10 which in addition to providing a physical connection to the serial bus 3 also connects the device to a power supply and to a high voltage supply for the erase control unit 9.

Data is transferred across the interface using a series of twelve bit frames, each frame including eight data bits. With a nominal clock rate of 1.536 Mhz this is equivalent to a maximum transfer rate of 128 Kbytes/-second. The remaining four bits of each frame contain control information.

The operation of the interface is governed by a protocol which is defined in detail below. The protocol consists of two layers. A Physical layer defines the hardware interface and the frame structure. The Transport layer defines system control and register transfers between the controller 1 and the slaves 2. The two layers of the protocol described below are entirely general purpose in nature and by no means limited to the application described in the specific example. Where required, higher level protocols may be built on the two fundamental layers described below to meet the requirements of a specific application or category of applications.

Figure 5A:
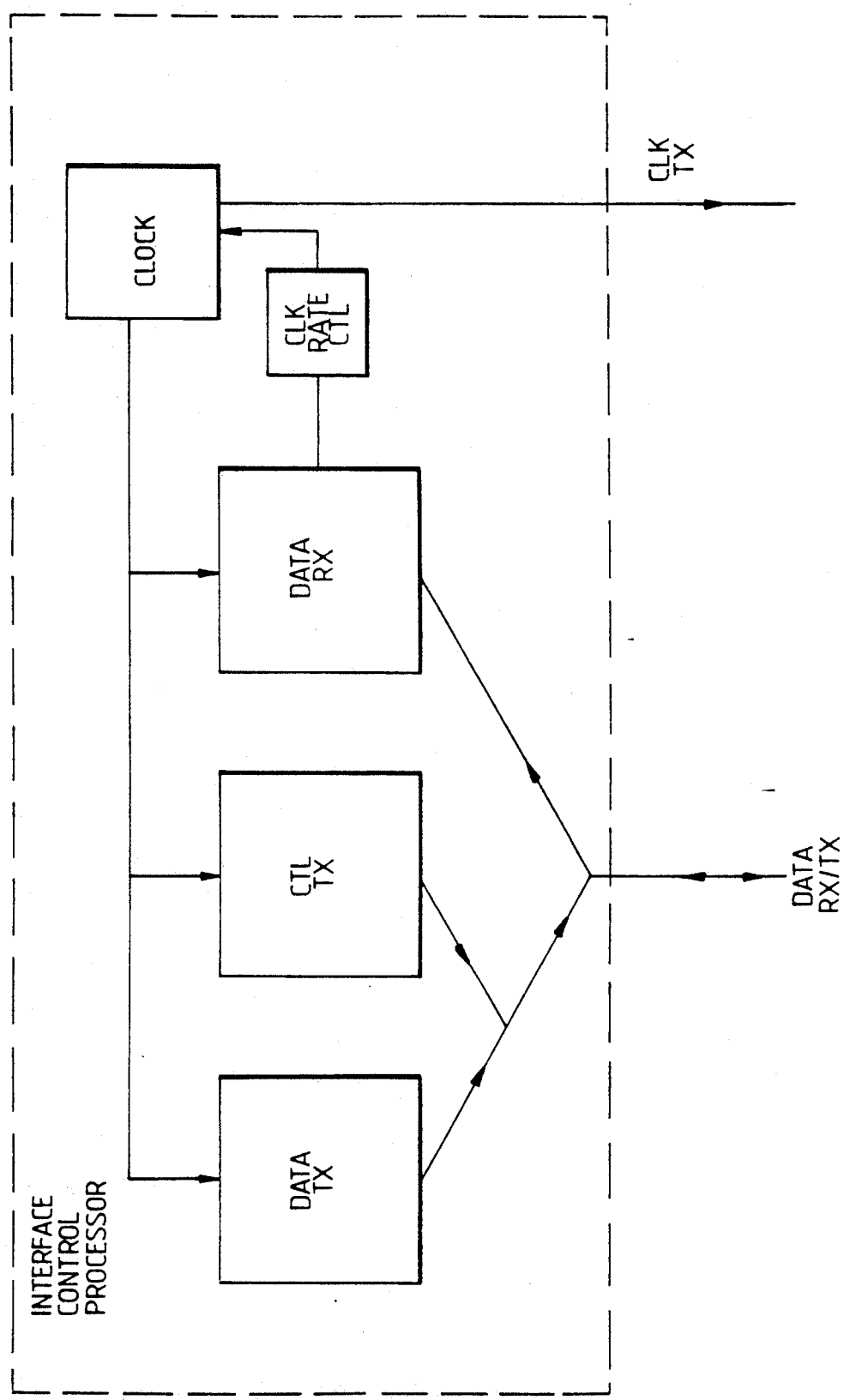
FIG. 5A is a schematic block diagram of a processor configured for a control function.

FIGS. 5A and 5B show schematically the structure of processors suitable for implementing the serial interface protocol. The switches, data and control transmitters, and data and control receivers may be implemented in a suitable logic network or alternatively may be provided by appropriate programming of a microprocessor. In the case of the slave processor shown in FIG. 5b, the information field, and identification store may be provided by a dedicated region of read only memory within the processor. The manner in which the different switches within the slave processor are set in response to incoming data from the control processor is set out below in the detail description of the serial interface protocol.

Figure 6:
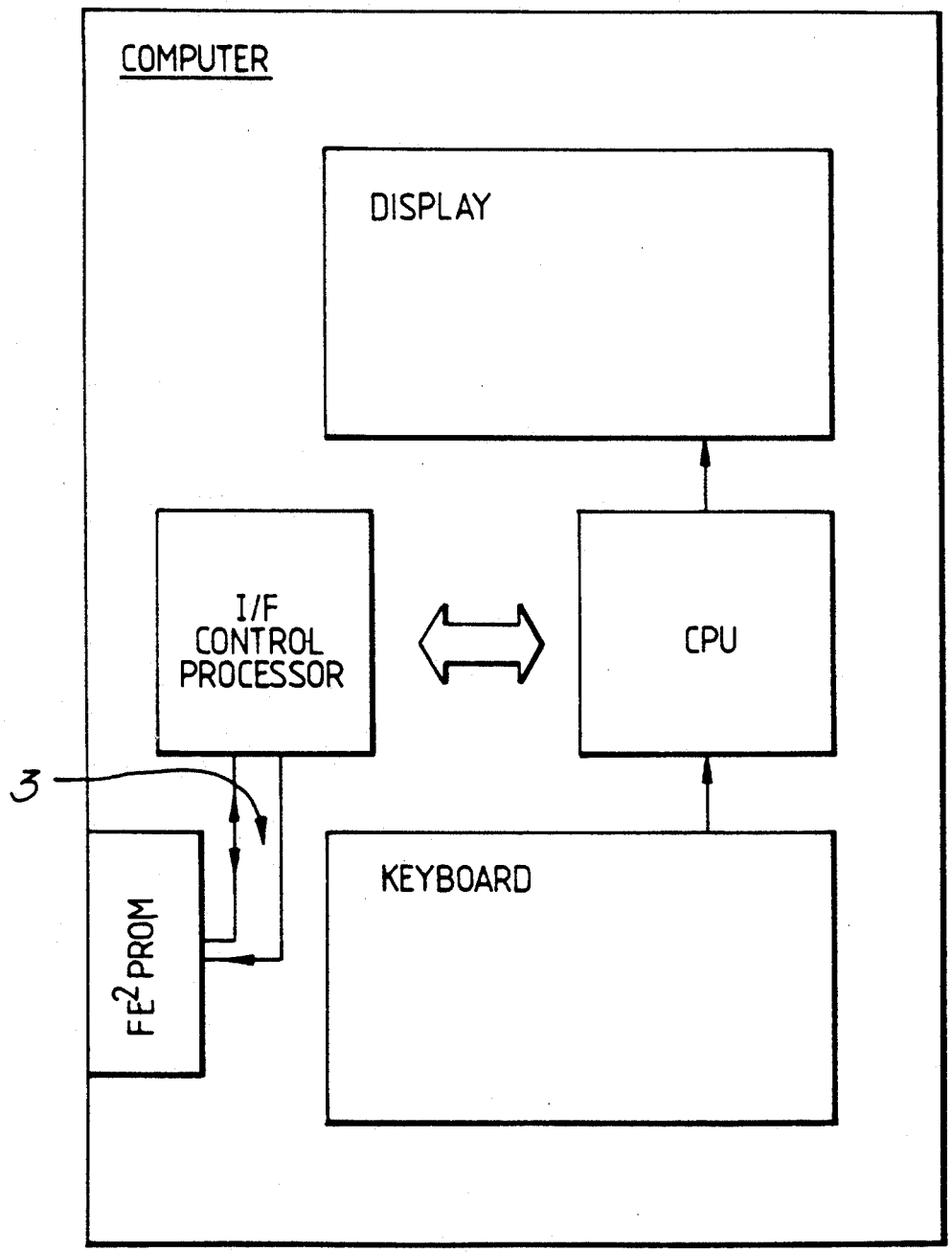
FIG. 6 is a block diagram of a computer.

FIG. 6 is a diagram showing a computer which may, for example, be a hand held or lap top computer such as that sold by the assignees as the PSION MC400. In the example shown, a peripheral in the form of a $FE^2$-PROM mass storage device is fitted to the computer. The serial interface links the $FE^2PROM$ via a serial bus 3 to the interface control processor 1. The CPU addresses the contents of the $FE^2PROM$ via the serial interface.

SERIAL INTERFACE PROTOCOL

Physical Layer

The physical layer of the protocol defines hardware requirements, low level frame structure and timing for the interface.

Hardware Interface

This consists of two lines that switch at 5 V CMOS voltage levels:

1. CLK—A clock input from the controller to the slaves. Nominally 1.536 Mhz.
2. DATA—A bi-directional synchronous data line.

Clock Line

This line is used to clock synchronously data between the controller and slaves. It is always output from the controller.

Rest State

The clock should be active only during the transfer of data. At all other times it is tristate pulled low.

Clock Timing Parameters

Figure 2A:
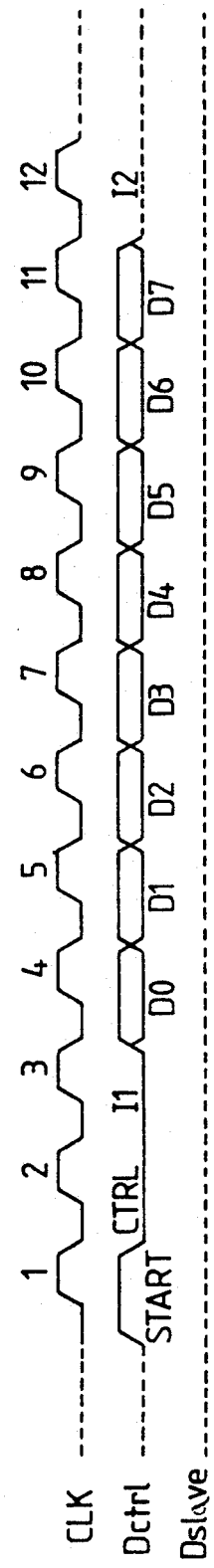
FIG. 2.1 to 2.3 are timing diagrams for control, data output and data input frames.
Figure 2B:
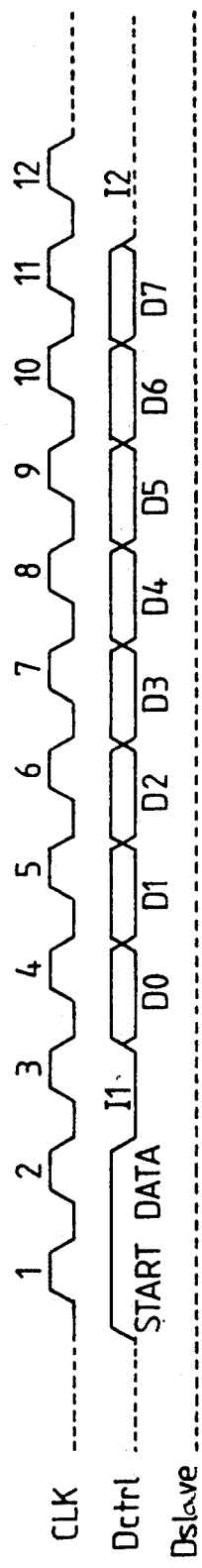
Figure 2C:
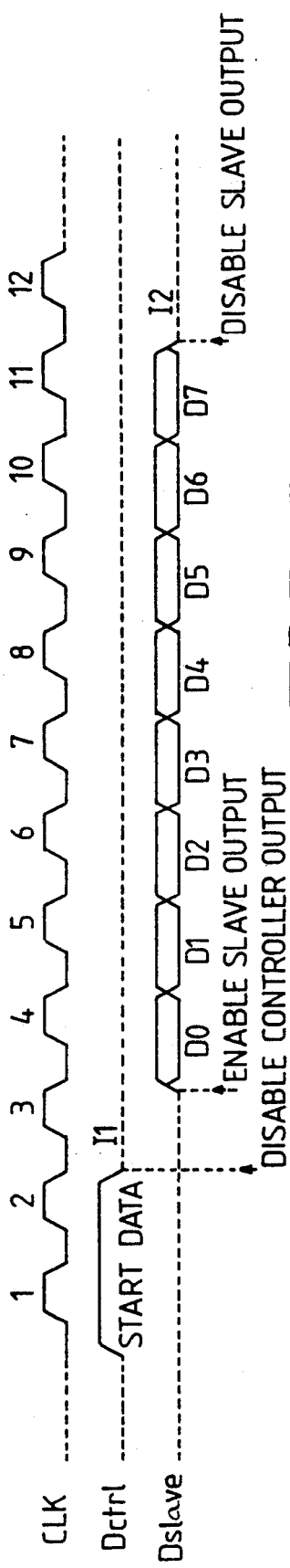

The clock line timing is shown in FIG. 2.1.

| Symbol | Parameter | Min | Typ | Max | |
|---|---|---|---|---|---|
| Tckh | Width of Clock High | 200 | 260 | — | ns |
| Tckl | Width of Clock Low | 350 | 391 | — | ns |
| Fck | Clock Frequency | | | 1.536 | Mhz |

Data Line

This is a bi-directional line used to transfer data synchronously between the controller and slaves.

The direction of the data line is not determined by the physical layer but by the control information in the transport layer. This is described below.

Rest State

When no data transfers are in progress the data line is always set to input on both the controller and slaves. This line is pulled low.

Data Timing Parameters

The data line timings are shown in FIG. 2.1.

| Symbol | Parameter | Min | Typ | Max | |
|---|---|---|---|---|---|
| Data Received by Controller | | | | | |
| Trdset | Data Set-Up Time | 50 | | | ns |
| Trdhld | Data Hold Time | 10 | | | |
| Data Transmitted by Controller | | | | | |
| Txdset | Data Set-Up Time | | Tclkl-90 | | ns |
| Txdhld | Data Hold Time | | Tclkh | | ns |

Data is changed on the falling edge of clock by the transmit device and latched into the receiving device on the rising edge of clock.

Physical Layer Protocol

The physical layer protocol consists of a series of 12 bit frames.

There are four types of frames:
1. Null Frame. Transmitted by controller to synchronise slaves.
2. Control frame. Control information transmitted by controller to slaves.
3. Data output frame. Data frame transmitted by controller to slaves.
4. Data input frame. Data frame received by controller from a slave.

Null Frame

This is a special frame transmitted by the controller to ensure all slaves are synchronised. It is generated by transmitting 12 clock pulses with the data line set to input. Since the data line is pulled low this results in 12 zeroes being transmitted.

Structure

The control and data frames have the following structure:

| Bit | 0 | 1 | 2 | 3 | 4 | 5 | 6 | 7 | 8 | 9 | 10 | 11 |
|---|---|---|---|---|---|---|---|---|---|---|---|---|
| | ST | CTL | I1 | D0 | D1 | D2 | D3 | D4 | D5 | D6 | D7 | I2 |

ST Start bit. This bit goes high to indicate the start of a valid frame.
CTL Control bit. When low indicates this is a control frame. High indicates a data frame.
I1 Idle bit. Used to turn around direction of data line. Normally low.
D0–D7 Data bits.
I2 Idle bit. Used to turn around direction of data line. Normally low.

Control frame

This frame is transmitted from the controller to one or more slaves. The timing of a control frame is shown in FIG. 2.2.

The data line outputs from the controller throughout the whole frame.

The bits in the frame have the following value in a control frame.
ST Start bit. This bit goes high to indicate the start of a valid frame.
CTL Control bit. Low to indicate this is a control frame.
I1 Idle bit set low.
D0–D7 Data bits. 8 bits of control information.
I2 Idle bit set low.

Data Output Frame

This frame is transmitted from the controller to one or more slaves. The timing of a data output frame is shown in FIG. 2.

The data line outputs from the controller throughout the whole frame.

The bits in the frame have the following value in a data output frame.
ST Start bit. This bit goes high to indicate the start of a valid frame.
CTL Control bit. High to indicate this is a data frame.
I1 Idle bit set low.
D0–D7 Data bits. 8 bits of transmitted data.
I2 Idle bit set low.

Data Input Frame

This frame is received by the controller from a slave. The timing of a data input frame is shown in FIG. 2.3

The data line is output from the controller for cycles 1 and 2 and input to the controller for cycles 4 to 11.

The bits in the frame have the following value in a data input frame.
ST Start bit. Output from controller. This bit goes high to indicate the start of a valid frame.
CTL Control bit. Output from controller. High to indicate this is a data frame.
I1 Idle bit. Used to turn around direction of data line. Both controller and slave should tristate the data line during this bit. Should be low due to pull down resistor on data line. The controller changes the data line from output to input at the end of cycle 2.

The slave changes the data line from input to output at the start of cycle 4.

D0-D7 Data bits. Output from slave 8 bits of data transmitted by slave. Controller sets data line to input during these bits.

I2 Idle bit. Used to turn around direction of data line. Both controller and slave should tristate the data line during this bit. Should be low due to pull down resistor on data line. The slave changes data line from output to input at the end of cycle 11.

Data Line Direction

The following table summarises the direction of the data line.

| Condition | CONTROLLER CK | CONTROLLER DATA | SLAVE CK | SLAVE DATA |
|---|---|---|---|---|
| Outside Frame | T | I | I | I |
| Null frame | O | I | I | I |
| Control Frame | O | O | I | I |
| Data output from controller | O | O | I | I |
| Data output to controller:- | | | | |
| Cycles 1-2 | O | O | I | I |
| Cycles 3 | O | I | I | I |
| Cycles 4-11 | O | I | I | O |
| Cycles 12 | O | I | I | I |

Key
T Tristate
I Input
O Output

Transport Layer

This section defines the transport level protocol that operates above the Physical layer protocol. The transport layer protocol controls the serial communication between the control processor 1 and the slave processors 2. The following rules apply:

- The interface is controlled by the writing of control bytes from the controller 1 to the slaves 2.
- Control bytes cannot be written by the slaves 2.
- Unsolicited data cannot be sent from a slave to main controller 1.

The transport layer protocol provides that each slave 2 should have a unique identifying number. As described below, a 6 bit field is used for this purpose. In the present example therefore slave 1 might have the ID 000001 and slave 2 the ID 000010. No slave has an ID of 0 and so control frames with 0 in the ID field maybe used to reset all slaves or to deselect a slave.

The control processor 1 contains two registers to communicate to the slaves.

1. Control register (byte, write only).
2. Data register (byte or word, read/write)

Control bytes are transmitted to the slaves by writing to the control register. The control word can have two distinct formats depending on the setting of bit 7, the select (S) bit.

Slave Select (Select=0)

This mode is for selecting, deselecting and resetting slaves. The format of the control word is as follows:

|  | 7 | 6 | 5 | 4 | 3 | 2 | 1 | 0 |
|---|---|---|---|---|---|---|---|---|
| NAME | S | R | I | I | I | I | I | I |
| STATE | 0 | x | x | x | x | x | x | x |

(x = see below)

S = Select bit. CLEAR for select mode
R = Reset bit.
IIIIII = 6 bit ID field.

The 6 bit ID field is a property only of the slave. No slave may have an ID of zero, hence there can be 63 different slaves connected to one controller.

| S | R | ID | Description |
|---|---|---|---|
| 0 | 0 | 0 | Reset all slaves |
| 0 | 0 | xx<>0 | Reset specific slave with ID = xx |
| 0 | 1 | 0 | Deselect slave (does not reset slave) |
| 0 | 1 | xx<>0 | Select slave with ID=xx and read slave info (see below). |

The Reset function is dependent on the slave. It would normally put the slave into a known state.

Select Slave with ID=xx (S=0,R=1)

This is a special command that causes a slave with ID=xx to transmit to the controller an 8 bit information field. This field depends entirely on the slave but must be non zero. A reply of 0 indicates that there is no slave of the requested ID present.

Slave Control (Select=1)

This mode is for communicating with a slave which has been previously selected using the select slave command described above. The format of the control word in this mode is described below:

|  | 7 | 6 | 5 | 4 | 3 | 2 | 1 | 0 |
|---|---|---|---|---|---|---|---|---|
| NAME | S | R/W | B/2B | S/M | X | X | X | X |
| STATE (see below) | 1 | x | x | x | x | x | x- | x |

S = Select bit. Set for slave control.
R/W = Read/write select.
  0 = write
  1 = read
B/2B = Data transfer size.
  0 = 1 byte transfer
  1 = 2 byte transfer
S/M = Single/Multi transfer mode
  0 = single
  1 = multi
XXXX = 4 bits of data to slave.

Note the meaning of the 4 bits of data (XXXX) is entirely dependent on the slave.

The settings of R/W,B/2B,S/M bits in the control word determine the size, type and direction of subsequent data transfers in the following manner:

| R/W | B/2B | S/M | |
|---|---|---|---|
| 0 | 0 | 0 | 1) write a single byte to slave |
| 0 | 0 | 1 | 2) write a number of single bytes to slave |
| 0 | 1 | 0 | 3) write a byte pair to slave |
| 0 | 1 | 1 | 4) write a number of byte pairs to slave |
| 1 | 0 | 0 | 5) read a single byte from slave |
| 1 | 0 | 1 | 6) read a number of single bytes from slave |
| 1 | 1 | 0 | 7) read a byte pair from slave |
| 1 | 1 | 1 | 8) read a number of byte pairs from slave |

Write a single byte

This command readies the currently selected slave to receive a byte of data and sets up the controller so that the next byte (or the LSB of a word) written to its data register will be transmitted to that slave. Anything further written to the controller's data register will have no effect.

Write a number of single bytes

This command readies the currently selected slave to receive a number of sequential bytes of data. The slave will expect to receive data bytes until another control byte is received. The controller is set up so that the next byte (or the LSB of a word) written to its data register will be transmitted to that slave. All subsequent bytes written to the controller's data register will be transmitted to the slave. This will continue until another byte is written to the controller's control register.

Write a byte pair

This command readies the currently selected slave to receive two bytes of data and sets up the controller so that the next word written to its data register will be transmitted to that slave (LSB first). Anything further written to the controller's data register will have no effect.

Write a number of byte pairs

This command readies the currently selected slave to receive a number of sequential byte pairs of data. The slave will expect to receive byte pairs until another control byte is received. The controller is set up so that the next word written to its data register will be transmitted to that slave (LSB first). All subsequent words written to the controller's data register will be transmitted to the slave. This will continue until another byte is written to the controller's control register.

Read a single byte

This command triggers a byte to be transmitted from the selected slave to the controller. This byte can then be read from the LSB of the controller's data register. Further reads of the controller's data register will return the same data but have no effect on the protocol.

Read a number of single bytes

This command triggers a byte to be transmitted from the selected slave to the controller. This byte can then be read from the LSB of the data register. This read will trigger the next byte to be transmitted to the data register of the controller. All subsequent reads of the controller's data register will trigger further bytes to be transmitted to the controller. This will continue until another byte is written to the controller's control register.

Read a byte pair

This command triggers a byte pair to be transmitted from the selected slave to the controller. This word can then be read from the controller's data register. Further reads of the controller's data register will return the same data but have no effect on the protocol.

Read a number of byte pairs

This command triggers a byte pair to be transmitted from the selected slave to the controller. This word can then be read from the controller's data register. This read will trigger the next byte pair to be transmitted to the data register of the controller. All subsequent reads of the controller's data register will trigger further byte pairs to be transmitted to the controller. This will continue until another byte is written to the controller's control register.

Timing

The time for commands to be processed and data sent is shown below. The time is given in SIBO pack protocol clock cycles. The length of a clock cycle is nominally 651 nanoseconds.

| Receive and process the control byte | 12 cycles |
|---|---|
| Byte transfer to or from slave | 12 cycles |
| Byte pair transfer to or from slave | 24 cycles |

When writing to the controller's data and control registers the following rules apply:
1. After writing to the control register there must be a delay of at least 12 cycles before the data register is accessed or another control word is written.
2. To read a word from the data register after the command to read byte pair is issued there must be delay of a least 12 (for control byte)+24 (for the byte pair transfer)=36 cycles.
3. To perform a multiple byte pair write there must be a delay of at least 12 cycles after the command is written to the control register before the first word can be written to the data register and a delay of at least 24 cycles between subsequent writes to the data register.

States

A slave can be in one of 5 states. Note a control byte can be received and interpreted at any time.
1. RB Waiting to receive a data byte or control byte.
2. RBP Waiting to receive a data byte pair or control byte.
3. TB Waiting to transmit a data byte or control byte.
4. TBP Waiting to transmit a data byte pair or control byte.
5. RC Waiting to receive control byte only.

The following table shows the state after each control word is received.

| Control Word | | | | | | State |
|---|---|---|---|---|---|---|
| S | R | IIIIII | | | | |
| 0 | 0 | 0 | | | Reset all | RC |
| 0 | 0 | <>0 | | | Reset slave | RC |
| 0 | 1 | 0 | | | Deselect slave | RC |
| 0 | 1 | <>0 | | | Select slave | TB |
| S | RW | B2B | SM | XXXX | | |
| 1 | 0 | 0 | 0 | x | write byte | RB |
| 1 | 0 | 0 | 1 | x | write bytes | RB |
| 1 | 0 | 1 | 0 | x | write byte pair | RBP |
| 1 | 0 | 1 | 1 | x | write byte pairs | RBP |
| 1 | 1 | 0 | 0 | x | read byte | TB |
| 1 | 1 | 0 | 1 | x | read bytes | TB |
| 1 | 1 | 1 | 0 | x | read byte pair | TBP |
| 1 | 1 | 1 | 1 | x. | read byte pairs | TBP |

In the present example the peripherals connected via the interface to the computer are mass storage devices of a type which have been termed by the inventors "memory paks" (sic). Each pak contains a region of memory divided into 256 byte tracks. The form and number of memory devices and the number of paks per device is dependent on the size and type of the pak. The slave processor 2 for each pak is termed a "pak chip" SPS (SIBO protocol slave) and allows communication between the control processor 1, that is a SIBO protocol master (SPM) and the memory pak. In the present example slave 1 includes a dedicated pak chip and slave 2 contains an ASIC in PAKCHIP mode.

Pakchip ID and Information Bytes

The PAKCHIP has an ID byte=1.
ASIC5 in PAKCHIP mode has an ID byte=2.
The format of the Information Byte returned when the PAKCHIP is selected is as follows:

```
        7 6 5 4 3 2 1 0
        D D D N N S S S
DDD     Device type
000     RAM pack
001     Flash EPROM pack (INTEL)
010     Flash EPROM pack type 2
011     Flash EPROM pack type 3
100     Flash EPROM pack type 4
101     Flash EPROM pack type 5
110     Read only pak
111     Write protected pak
NN      Number of memory devices
00      1 device
01      2 devices
10      3 devices
11      4 devices
SSS     Device size
000     Illegal (indicates no device present)
001     32k
010     64k
011     128k
100     256k
101     512k
110     1M
111     2M
```

This info byte is set on a memory pak by a series of pull up and pull down resistors on the databus. It is accessed by reading the databus with none of the memory devices selected.

PAKCHIP selection and resetting

The PAKCHIP ID=1 hence a pak is selected and rest by the following control bytes:

| S | R | IIIIII | | ACTION |
|---|---|--------|---|--------|
| 0 | 0 | 000000 | 00 | Reset all slaves |
| 0 | 0 | 000001 | 01 | Reset PAKCHIP |
| 0 | 1 | 000000 | 40 | Deselect PAKCHIP |
| 0 | 1 | 000001 | 41 | Select PAKCHIP |

ASIC5 selection and resetting

The ASIC5 ID=2 hence a pak is selected and rest by the following control bytes:

| S | R | IIIII | | ACTION |
|---|---|-------|---|--------|
| 0 | 0 | 000000 | 00 | Reset all slaves |
| 0 | 0 | 000010 | 02 | Reset PAKCHIP |
| 0 | 1 | 000000 | 40 | Deselect PAKCHIP |
| 0 | 1 | 000010 | 42 | Select PAKCHIP |

PAKCHIP Structure

The PAKCHIP is organised as a number of 8 or 16 bit registers which may be selected and written to/read from by the SPM:

| REGISTER | SIZE | R/W |
|----------|------|-----|
| ADDRESS | 16-BIT | W |
| DATA | 8-BIT | R/W |
| CONTROL LINE LATCH | 1-BIT | W |

The PAKCHIP also contains a TRACK COUNTER which the SPM cannot access directly.
The registers and the TRACK COUNTER will be described in detail later.

Communicating with a PAKCHIP

To communicate with a PAKCHIP register the SPM must first specify the register and the type of data transfer to take place (i.e. read or write, byte or double byte, single or multiple mode) by writing a control byte. Subsequent data transfers will take place with the specified register in the mode specified by the control byte until the next control byte is received.

The format of the control byte for communicating with a selected PAKCHIP is as follows:

| BIT | 7 | 6 | 5 | 4 | 3 | 2 | 1 | 0 |
|-----|---|---|---|---|---|---|---|---|
| NAME | S | W/R | B/2B | S/M | A | A | A | A |
| STATE | 1 | X | X | X | X | X | X | X |

S = Select Bit. Set for PAKCHIP control.
W/R = Write/Read select.
  0 = write
  1 = read
B/2B = Data transfer size.
  0 = 1 byte transfer
  1 = 2 byte transfer
  (NOT IMPLEMENTED)
S/M = Single/Multi transfer mode
  0 = single
  1 = multi
AAAA = Register Address:-
AAAA     R/W  REGISTER
0000  0  R/W  DATA
0011  3  W    ADDRESS (16 bit multiple write)
0111  7  W    CONTROL LINE LATCH

Single/Multi Transfer Mode

For a PAKCHIP Single and Multi transfers may be specified for any register but the effect of subsequent data transfers will be no different except in the case of the Data Register or the Address register.

DATA register. In multi-transfer mode the Track Counter will be incremented after a Data Register access.

ADDRESS register. In multi-transfer mode the first write will set up the LSB (bits 8-15) of the pak address addr. The second write will set up the MSB (bits 16-20) of the pak address and select which device to access.

For specifying communication with a PAKCHIP the following Control Bytes are normally used to specify data transfers:

| Control Byte | | | | | | | Data Transfer Setup |
|---|---|---|---|---|---|---|---|
| S | WR | B2B | SM | XXXX | | R/W | Description |
| 1 | 0 | 0 | 1 | 0011 | 93 | W | Byte to Address Register |
| 1 | 0 | 0 | 0 | 0111 | 87 | W | Byte to Control line latch |
| 1 | 0 | 0 | 0 | 0000 | 80 | W | Byte to Data register |
| 1 | 1 | 0 | 0 | 0000 | C0 | R | Byte from Data register |

-continued

| | | | | | | | |
|---|---|---|---|---|---|---|---|
| 1 | 0 | 0 | 1 | 0000 | 90 | W | Byte to Data register incrementing Track Counter |
| 1 | 1 | 0 | 1 | 0000 | D0 | R | Byte from Data register incrementing Track Counter |

PAKCHIP Pinout
The PAKCHIP is a 44-pin device:-

| PIN NAME | I/O | PIN NAME | I/O |
|---|---|---|---|
| VCC | I | GND | I |
| POR_B | I | A20 | O |
| CLK | I | A19 | O |
| SD | I/O | A18 | O |
| D7 | I/O | A17 | O |
| D6 | I/O | A16 | O |
| D5 | I/O | A15 | O |
| D4 | I/O | A14 | O |
| D3 | I/O | A13 | O |
| D2 | I/O | A12 | O |
| D1 | I/O | A11 | O |
| D0 | I/O | A10 | O |
| CS3_B | O | A9 | O |
| CS2_B | O | A8 | O |
| CS1_B | O | A7 | O |
| CS0_B | O | A6 | O |
| OE_B | O | A5 | O |
| WR_B | O | A4 | O |
| NC | — | A3 | O |
| NC | — | A2 | O |
| NC | — | A1 | O |
| VPPSW | O | A0 | O |

CS0_B-CS3_B = Memory Device chip selects
A0-A20 = Memory Device address lines
D0-D7 = Data
OE_B = Output enable
WR_B = Write enable
POR_B = Power On Reset
SD = Serial Data In/Out
CLK = Clock In
NC = No connection

PAKCHIP REGISTERS

Address Register

The address register is written to in multi-transfer mode LSB first.

| AH | AL |
|---|---|
| Bit: 15 14 13 12 11 10 9 8 | 7 6 5 4 3 2 1 0 |
| Lable: C C x T T T T T | T T T T T T T T |

CC  Device select (only one memory device is chip selected when a read or write occurs as determined by CC.)
 00  Select device 1  (CS0_B is active output)
 01  Select device 2  (CS1_B is active output)
 10  Select device 3  (CS2_B is active output)
 11  Select device 4  (CS3_B is active output)
TT.. Track number
 (T0-T12 map directly onto output lines A8-A20. For example, if bit 1 = 1 in the address register then output A9 is HIGH)
x  Bit 13 is not used.

A RESET (power on or SPM instigated) clears all bits of the address register.
A write to the address register clears the Track Counter.

Data Register

| Bit: | 7 | 6 | 5 | 4 | 3 | 2 | 1 | 0 |
|---|---|---|---|---|---|---|---|---|
| Label: | DR7 | DR6 | DR5 | DR4 | DR3 | DR2 | DR1 | DR0 |

DR0-DR7 correspond to PAKCHIP I/O lines D0-D7.

Data written to the Data Register is output on D0-D7 during a write cycle.

Data input to D0-D7 may be read from the data register during a read cycle.

The Track Counter is incremented after a data register read or write in MULTIPLE mode.

Control Latch Address $7 write only

| Bit: | 7 | 6 | 5 | 4 | 3 | 2 | 1 | 0 |
|---|---|---|---|---|---|---|---|---|
| Label: | x | x | x | x | VPPEN | x | x | x |

Setting VPPEN high enables VPP onto EPROM packs.

Reading from/Writing to PAKS

RAMPAKS a) Reading

To read a RAMPAK the memory device and Track number must first be specified by writing to the Address Register. The whole track is normally then read by means of a "Block Read" which involves a 256 byte read from the Data Register in Multiple mode. The Track Counter is incremented after each read of the Data Register and the CS_B, WR_B and OE_B lines are automatically controlled by the PAKCHIP during each read cycle.

b) Writing

Writing to a RAMPAK is similar to reading from it. To write to a RAMPAK the memory device and Track number must first be specified by writing to the Address Register. The whole track is normally then written by means of a "Block write" which involves 256 byte writes to the Data. Register in Multiple mode. The Track Counter is incremented after each write to the Data Register and the CS_B, OE_B and WR_B lines are automatically controlled by the PAKCHIP during each write cycle.

I claim:

1. A method of communicating data between first means for processing configured for a control function and second means for processing configured for a slave function over a serial interface; wherein said interface comprises two lines only, a bi-directional data line and a uni-directional clock line; said method comprising:
transmitting a clock signal from said first means for processing over said clock line to said second means for processing, and concurrently carrying out one of the two following functions; (1) transmitting one of a control frame and data frame from said first means for processing over said serial interface to said second means for processing; and (2) transmitting a data frame from said second means for processing over said serial interface to said first means for processing;
said method further comprising transmitting as part of each frame a control identification portion for identifying a frame as one of a control frame and a data frame, and transmitting following said control identification potion a plurality of data bits bounded by idle bits, both said first means for processing and said second means for processing freeing said bi-directional data line for a change in direction of data transmission during each said idle bit.

2. The method of claim 1, further comprising transmitting as one of said data bits of said control frame a select bit for identifying said control frame as one of a slave select frame and a slave control frame;

each slave select frame including as a further one of said data bits a reset bit, when said reset bit takes one predetermined value transmission of said slave select frame to said second means for processing causing said second means for processing to reset to a predetermined state, otherwise said transmission of said slave select frame to said second means for processing effecting one of selection and deselection of said second means for processing;

each slave control frame including as one of said data bits data transmission parameters for setting said second means for processing to carry out one of reading and writing at least one data frame subsequent to a current control frame.

3. The method of claim 2, further comprising transmitting as one of said transmission parameters of said slave control frame a read/write bit for determining which one of reading and writing is carried out by said second means for processing in a subsequent data frame and a single unit/multiple unit flag bit for determining which of single and multiple units of data are communicated in said subsequent data frame.

4. The method of claim 3, further comprising assigning to said second means for processing a unique identification number and transmitting as one of said data bits of said slave select frame an identification field, said second means for processing in response to any slave select frame including as said identification field said unique identification number subsequently transmitting to said first means for processing a data frame including a predetermined information field.

5. The method of claim 4, wherein said first means for processing includes a variable rate clock, and means for generating a rate control signal for said variable rate clock and said means for generating output a modified rate control signal thereby adjusting a clock rate of said clock signal to a maximum rate compatible with said second means for processing in response to data in said predetermined information field.

6. A system for communicating serial data comprising:

first means for processing configured for a control function;

second means for processing configured for a slave function; and serial interface means linking said first means for processing to said second means for processing, said serial interface means comprising a bi-directional data line and a uni-directional clock line only;

said first means for processing including means for generating a clock signal for transmission over said clock line to said second means for processing and concurrently carrying out one of the two following functions: (1) transmitting one of a control frame and a data frame from said first means for processing over said serial interface means to said second means for processing; and (2) receiving a data frame transmitted over said serial interface means form said second means for processing; said first means for processing including first means for transmitting control frames and data frames onto said serial interface means and first means for reading data frames from said serial interface means;

and said second means for processing including second means for transmitting data frames onto said serial interface means, and second means for reading control frames and data frames from said serial interface means, and means for receiving said clock signal form said clock line and synchronizing said second means for transmitting and second means for reading with said first means for processing in response to said clock signal, wherein said first and second means for transmitting and said first and second means for reading include means for transmitting and reading respectively frames comprising a control identification portion identifying a frame as one of a control frame and a data frame, and following said control portion a plurality of data bits bounded by idle bits, both said first and second means for processing freeing said data line for a change in direction of data transmission during each idle bit.

7. The system of claim 6, wherein each control frame includes as one of said data bits s select bit for identifying said control frame as one of a slave select frame and a slave control frame;

each slave select frame including as a further one of said data bits a reset bit, and said second means for processing including means for resetting said second means for processing to a predetermined state when said reset bit takes one predetermined value, and otherwise effecting one of selection and deselection in response to reading of said slave select frame by said second means for reading;

each slave control frame including as one of said data bits transmission parameters for setting said second means for processing to carry out one of reading and writing at least one data frame subsequent to a current control frame.

8. The system of claim 7, wherein said transmission parameters for said slave control frame include a read/write bit, said second means for processing including means responsive to said read/write bit for controlling said second reading means and second writing means to carry out one of reading or writing data in a succeeding data frame in accordance with a value of said read/write bit; and a single/multi bit, said second means for processing including means responsive to said single/multi bit for controlling said second reading means and second writing means to carry out one of reading and writing data in one of single and multiple units in subsequent data frames according to the value of said single/multi bit.

9. The system of claim 8, wherein said data bits of said slave select frame include an identification field, said second means for processing including means for storing a unique identification number and means responsive to any slave select frame including as its identification field said unique identification number subsequently to transmit to said first means for processing a data frame including a pre-determined information field.

10. The system of claim 9, wherein said first means for processing includes means responsive to said predetermined information field for controlling said means for generating a clock signal to adjust a rate of said clock signal to a maximum rate compatible with said second means for processing.

11. Processor means configured for a control function and adapted for use in the system of claim 6.

12. A hand held computer including the processor means of claim 11.

13. A lap top computer including the processor means of claim 11.

14. Processor means configured for a slave function and adapted for use in the system claim 6.

15. A peripheral for a hand held computer including the processor means of claim 14.

16. The peripheral of claim 15, wherein said peripheral includes a mass storage device.

17. The peripheral of claim 16, wherein said mass storage device includes an $FE^2PROM$.

18. A peripheral for a lap top computer including the processor means of claim 14.

19. The peripheral of claim 18, wherein said peripheral includes a mass storage device.

20. The peripheral of claim 19, wherein said mass storage device includes an $FE^2PROM$.

21. A computing system comprising:
   a portable personal computer including first means for processing configured for a control function;
   a peripheral device including second means for processing configured for a slave function; and
   serial interface means linking said first means for processing to said second means for processing for communication of serial data therebetween, said serial interface means comprising a bi-directional data line and a uni-directional clock line only;
   generating a clock signal for transmission over said clock line to said second means for processing and concurrently carrying out one of the two following functions; (1) transmitting one of a control frame and a data frame from said first means for processing over said serial interface means to said second means for processing; and (2) receiving a data frame transmitted over said serial interface means from said second means for processing; said first means for processing including first means for transmitting control frames and data frames onto said serial interface means and first means for reading data frames from said serial interface means;
   and said second means for processing including second means for transmitting data frames onto said serial interface means and second means for reading control frames and data frames from said serial interface means,
   wherein said first and second means for transmitting and said first and second means for reading include means for transmitting and reading respectively frames comprising a control portion identifying a frame as one of a control frame and a data frame, and following said control portion a plurality of data bits bounded by idle bits, both said first and second means for processing freeing said data line for a change in direction of data transmission during each idle bit, said second means for processing including means for receiving said clock signal from said clock line and synchronizing said second means for transmitting and second means for reading with said first means for processing in response to said clock signal.

22. The system of claim 21 wherein said peripheral device includes a mass storage device.

23. The system of claim 22 wherein said mass storage device includes an $FE^2PROM$, said peripheral device including means electrically connected between said serial interface means and said $FE^2PROM$ for applying an erase voltage to said $FE^2PROM$ in response to a control signal from said second means for processing.

* * * * *